United States Patent
Petrie

(10) Patent No.: US 9,327,974 B1
(45) Date of Patent: May 3, 2016

(54) ALUMINUM HYDRIDE PRODUCTION

(71) Applicant: Mark A. Petrie, Santa Clara, CA (US)

(72) Inventor: Mark A. Petrie, Santa Clara, CA (US)

(73) Assignee: Ardica Technologies, Inc., San Francisco, CA (US)

( * ) Notice: Subject to any disclaimer, the term of this patent is extended or adjusted under 35 U.S.C. 154(b) by 640 days.

(21) Appl. No.: 13/671,067

(22) Filed: Nov. 7, 2012

Related U.S. Application Data

(60) Provisional application No. 61/556,735, filed on Nov. 7, 2011.

(51) Int. Cl.
| | |
|---|---|
| *C01B 6/06* | (2006.01) |
| *C07B 31/00* | (2006.01) |
| *C07B 41/02* | (2006.01) |
| *C07C 1/22* | (2006.01) |
| *C07C 2/74* | (2006.01) |
| *C08F 4/12* | (2006.01) |
| *H01M 10/26* | (2006.01) |
| *H01M 8/02* | (2016.01) |
| *H01M 8/06* | (2016.01) |

(52) U.S. Cl.
CPC . *C01B 6/06* (2013.01); *C07B 31/00* (2013.01); *C07B 41/02* (2013.01); *C07C 1/22* (2013.01); *C07C 2/74* (2013.01); *C08F 4/12* (2013.01); *H01M 8/02* (2013.01); *H01M 8/065* (2013.01); *H01M 10/26* (2013.01)

(58) Field of Classification Search
None
See application file for complete search history.

(56) References Cited

U.S. PATENT DOCUMENTS

| | | |
|---|---|---|
| 3,032,037 A | 5/1962 | Havirco et al. |
| 3,184,528 A | 5/1965 | Norwalk et al. |
| 3,801,657 A | 4/1974 | Scruggs |
| 3,801,707 A | 4/1974 | Ardis et al. |
| 3,810,974 A | 5/1974 | King |
| 3,812,244 A | 5/1974 | Schmidt et al. |
| 3,816,192 A | 6/1974 | Brower et al. |
| 3,819,335 A | 6/1974 | Daniels et al. |
| 3,819,819 A | 6/1974 | Matzek et al. |
| 3,821,044 A | 6/1974 | Roberts |
| 3,823,226 A | 7/1974 | Brower et al. |
| 3,826,820 A | 7/1974 | Roberts et al. |
| 3,838,194 A | 9/1974 | Reigler et al. |
| 3,838,195 A | 9/1974 | Reigler et al. |

(Continued)

FOREIGN PATENT DOCUMENTS

| | | |
|---|---|---|
| DE | 10392795 T5 * | 12/2003 |
| GB | 833646 | 4/1960 |

(Continued)

OTHER PUBLICATIONS

Finholt, A. E. et al., "Lithium Aluminum Hydride, Aluminum Hydride and Lithium Gallium Hydride and Some of Their Applications in Organic and Inorganic Chemistry," J. Am. Chem. Soc., 69:1199-1203, May 1947.

(Continued)

*Primary Examiner* — Wayne Langel
(74) *Attorney, Agent, or Firm* — Carr & Ferrell LLP

(57) ABSTRACT

Methods for producing aluminum hydride are provided herein. Exemplary methods may include combining an amount of aluminum with an amount of a metal in such a way that a eutectic mixture is formed and treating the eutectic mixture with hydrogen gas to produce aluminum hydride. Various methods and processes are conducted under anhydrous conditions or within anhydrous systems.

11 Claims, 1 Drawing Sheet

(56) References Cited

U.S. PATENT DOCUMENTS

| | | | |
|---|---|---|---|
| 3,840,654 A | 10/1974 | Schmidt et al. | |
| 3,843,774 A | 10/1974 | York et al. | |
| 3,850,709 A | 11/1974 | Schmidt | |
| 3,857,930 A | 12/1974 | Kraus et al. | |
| 3,869,544 A | 3/1975 | Niles et al. | |
| 3,869,545 A | 3/1975 | Terada et al. | |
| 3,883,644 A | 5/1975 | Matzek et al. | |
| 4,006,095 A | 2/1977 | Hoffman et al. | |
| 4,048,087 A | 9/1977 | Daniels et al. | |
| 4,370,294 A | 1/1983 | Franken et al. | |
| 4,395,219 A | 7/1983 | Franken et al. | |
| 4,747,701 A | 5/1988 | Perkins | |
| 5,292,387 A | 3/1994 | Highsmith et al. | |
| 5,670,129 A | 9/1997 | Klapdor et al. | |
| 5,730,952 A | 3/1998 | Rathman et al. | |
| 6,228,338 B1 * | 5/2001 | Petrie | C01B 6/06 423/265 |
| 6,617,064 B2 | 9/2003 | Petrie et al. | |
| 7,238,336 B2 * | 7/2007 | Lund | C01B 6/06 423/644 |
| 7,521,037 B1 * | 4/2009 | Graetz | C01B 6/06 423/645 |
| 2001/0038821 A1 | 11/2001 | Petrie et al. | |
| 2007/0056970 A1 | 3/2007 | Scherer et al. | |
| 2008/0216906 A1 | 9/2008 | Curello et al. | |
| 2009/0291045 A1 * | 11/2009 | Graetz | C01B 6/243 423/645 |
| 2012/0017439 A1 | 1/2012 | Yamamoto et al. | |

FOREIGN PATENT DOCUMENTS

| | | |
|---|---|---|
| GB | 2281059 | 2/1995 |
| WO | WO2012018640 | 2/2012 |

OTHER PUBLICATIONS

Rice Jr., M. J. et al., Contract ONR-494(04) Astia No. 106967, U.S. Office of Naval Research. 1956.

Tskhai, A. N. et al., "The Kinetics and a Mathematical Model of the Isothermal Crystallisation of Aluminum Hydride from Ether-Toluene Solutions," Russian Journal of Inorganic Chemistry, 37(8):877-885. 1992.

Brower, F. M. et al., "Preparation and Properties of Aluminum Hydride," Journal of the American Chemical Society, 98(9):2450-2453. Apr. 28, 1976.

Bulychev, B. M. et al. (1998), "Complex Compounds of Aluminum Hydride Ethoxide with Mixed Aluminum and Boron Hydrides of Lithium and Magnesium: Compositions, Physicochemical Properties, and Synthesis of Unsolvated Aluminum Hydride," Russian Journal of Inorganic Chemistry, 43(5):752-758 and 43:829.

Zakharov, V. V. et al. (1992), "The Thermal Transformations of Ether Addition Compounds of Aluminum Hydride," Russian Journal of Inorganic Chemistry, 37(9):997-1005.

International Search Report and Written Opinion mailed Jan. 17, 2012 in Patent Cooperation Treaty Application No. PCT/US2011/045407, filed Jul. 26, 2011.

* cited by examiner

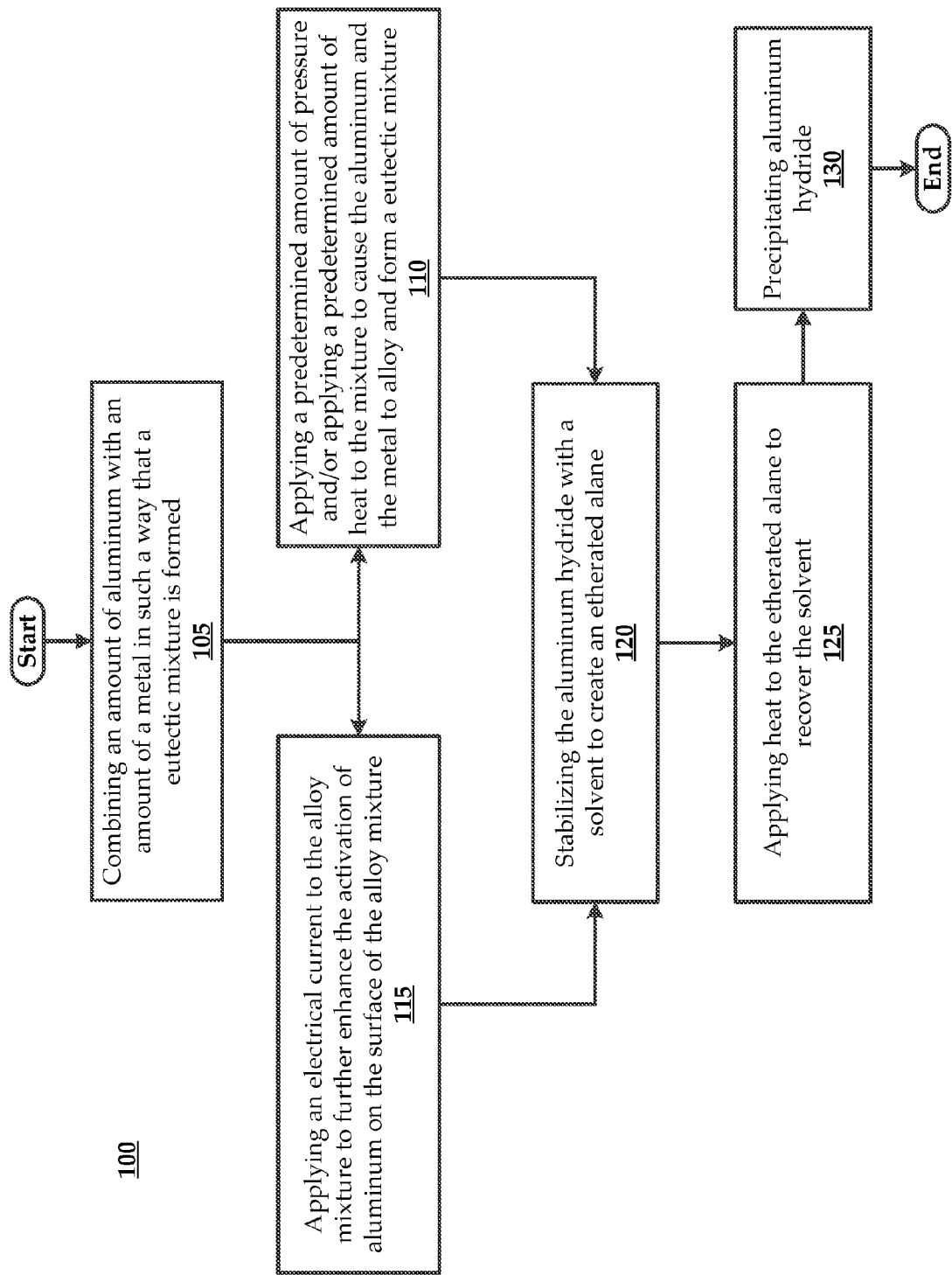

ALUMINUM HYDRIDE PRODUCTION

CROSS REFERENCE TO RELATED APPLICATIONS

This non-provisional U.S. patent application claims priority benefit of provisional U.S. patent application Ser. No. 61/556,735, filed on Nov. 7, 2011, which is hereby incorporated by reference herein in its entirety.

FIELD OF THE INVENTION

The present technology may be generally described comprising methods for producing aluminum hydride ($AlH_3$), also known as alane, under anhydrous conditions.

BACKGROUND

Economical production of aluminum hydride ($AlH_3$) or "alane" depends on an approach that combines aluminum with hydrogen in a manner that is energy efficient and practical. However, the rate of direct reaction between pure aluminum and hydrogen is very slow. A major barrier to this reaction is that little change in enthalpic energy ($\Delta H_f = -2.37$ kcal/mol $AlH_3$) occurs in the transformation of elemental aluminum and hydrogen to aluminum hydride. The ordered nature of the crystalline aluminum metal also inhibits reaction with hydrogen. Another barrier is that the aluminum oxide ($Al_2O_3$) coating that forms on the surface of aluminum when it comes in contact with air, reduces or limits the surface area of the reactive aluminum and inhibits the reaction with hydrogen.

The presence of gallium metal and other elements such as indium, mercury, tin, and bismuth in aluminum alloys are known to increase the "aqueous" electrochemical activity of aluminum as a sacrificial anode electrode in cathodic protection systems or in chemical power systems. Activation of aluminum can also occur through the addition of cations such as $In^{3+}$, $Ga^{3+}$, $Hg^{2+}$, $Sn^{4+}$ and $Sn^{2+}$ to the electrolyte.

SUMMARY OF THE PRESENT TECHNOLOGY

According to some embodiments, the present technology may be directed to methods that comprise, under anhydrous conditions, (a) combining an amount of aluminum with an amount of a metal in such a way that a eutectic mixture is formed, the eutectic mixture having an increased amount of activated aluminum relative to an amount of activated aluminum included in the amount of aluminum alone; and (b) treating the eutectic mixture with hydrogen gas to produce aluminum hydride.

According to some embodiments, the present technology may be directed to a process for the manufacture of aluminum hydride, the process comprising: (a) catalyzing aluminum to enhance reaction with hydrogen; and (b) exposing the catalyzed aluminum to hydrogen gas to form aluminum hydride.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

FIG. 1 is a flowchart of an exemplary process for the manufacture of aluminum hydride under anhydrous conditions.

DESCRIPTION OF EXEMPLARY EMBODIMENTS

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that the figures may be merely schematic representations of the present technology. As such, some of the components may have been distorted from their actual scale for pictorial clarity.

Generally speaking, the present technology includes methods and processes for producing $AlH_3$ in non-aqueous systems or under non-aqueous conditions. The present technology may facilitate enhanced activation of aluminum in anhydrous (e.g., non-aqueous) systems to enhance the reactivity of the aluminum with hydrogen gas in various chemical and/or electrochemical processes to produce $AlH_3$. The efficiency of these methods may relate to the extent of the activation of the aluminum in "non-aqueous" solvents and the ability to recycle the additive.

FIG. 1 illustrates an exemplary method 100 for producing aluminum hydride. It will be understood that the method 100 may occur under anhydrous conditions or within an anhydrous system. The method 100 may include an initial step 105 of combining an amount of aluminum, such as an aluminum powder, with an amount of a metal in such a way that an alloy eutectic mixture is formed. Thus, step 105 may include combining an aluminum powder with a metal to form an alloy. That is, the amount of aluminum that is present on the surface of the alloy is increased.

According to some embodiments, the metal that is used may include any suitable catalyzing metal that would be known to one of ordinary skill in the art such as gallium, indium, tin, mercury, bismuth, and any combinations thereof. It will be understood that the exact proportions of aluminum and one or more of these various additive metals may vary according to design requirements, although combinations that allow for enhanced activation of aluminum on the surface of the resultant mixture are preferred, but not required.

Additionally, in some embodiments, step 105 may comprise a sub-step 110 of applying a predetermined amount of pressure and/or applying a predetermined amount of heat to the mixture to cause the aluminum and the metal to alloy and form a eutectic mixture. The formation of the eutectic mixture and melting of the same allows the aluminum to collect on the surface of the eutectic mixture.

Therefore, a subsequent step of treating the eutectic mixture with hydrogen gas to produce aluminum hydride results in "enhanced activation" of the aluminum resultant to the increase in aluminum on the surface of the alloy relative to aluminum that has not been mixed with another metal to form a eutectic mixture.

In some embodiments, step 105 may comprise an optional sub-step 115 of applying an electrical current to the alloy mixture to further enhance the activation of aluminum on the surface of the alloy mixture.

Regardless of the method used, it may be advantageous to stabilize the aluminum hydride, because aluminum hydride is particularly susceptible to decomposition when exposed to air and/or water. Thus, the method 100 may include a step 120 of stabilizing the aluminum hydride with a solvent. In some instances the aluminum hydride may be combined with a solvent such as diethyl ether or toluene to prevent decomposition. The combination of diethyl ether with the aluminum hydride produces an etherated alane such as aluminum hydride-diethyl etherate. Other ether and amine complexes of aluminum hydride may also be generated.

The method may include a step 125 of applying heat to the etherated alane to recover the solvent and a step 130 of precipitating crystallized aluminum hydride from the etherated alane solution. The aluminum hydride may then be used as needed. An exemplary use for the aluminum hydride may include the creation of an anode, which may be used in various electrochemical processes such as energy generation. Another exemplary use includes storing an amount of hydrogen in the aluminum hydride. In other instances, the aluminum hydride may be used as a combustible fuel additive.

In accordance with the present technology, the method 100 described above may be used to produce a product that may be used in an alkaline storage battery comprising a positive electrode, a negative electrode comprised of a hydrogen storage material, and an aqueous alkaline electrolyte. The hydrogen storage material may include the aluminum hydride produced by the method 100.

In accordance with the present technology, the method 100 described above may be used to produce a product that may be used in a method for reducing a functional group in a molecule by reaction with a reducing agent comprising a hydride donor. The hydrogen donor may include the aluminum hydride produced by the method 100.

In accordance with the present technology, the method 100 described above may be used to produce a product that may be used in a method for conducting a reaction comprising the polymerization of monomers using a polymerization catalyst comprising a hydride donor. The hydrogen donor may include the aluminum hydride produced by the method 100.

In accordance with the present technology, the method 100 described above may be used to produce a product that may be used in a fuel cell for continuously delivering electricity, comprising a contained hydrogen source as a fuel, and an oxidant. The hydrogen source may include the aluminum hydride produced by the method 100, which has been doped with hydrogen.

Energetic Compositions

A primary use of stabilized α-alane prepared herein is in the manufacture of explosive and propellant compositions, particularly in the manufacture of rocket propellant compositions, including solid and solution propellants, typically solid propellants. Alane is known to be useful as an energy dense fuel in propellant formulations. The use of alane produced by the methods described herein significantly increases the stability of the propellant composition, and thus provides an important advance in the field. The propellant compositions herein, in addition to alane, contain a binder material and an oxidizer. Examples of binder materials for use in propellant applications include but are not limited to polyoxetanes, polyglycidyl azide, hydroxyl-terminated polybutadiene, polybutadieneacrylonitrileacrylic acid terpolymer, polyethers, polyglycidyl nitrate, and polycaprolactone; see, e.g., U.S. Pat. No. 5,292,387 to Highsmith et al.

Examples of oxidizers that may be incorporated into the compositions include, but are not limited to, ammonium nitrate (AN), phase-stabilized ammonium nitrate (PSAN), ammonium dinitramide (ADN), potassium nitrate (KN), potassium dinitramide (KDN), sodium peroxide ($Na_2O_2$), ammonium perchlorate (AP), KDN-AN, a cocrystallized form of potassium dinitramide and ammonium nitrate, cyclo-1,3,5-tri-methylene-2,4,6-trinitramine (RDX or cyclonite), high melting explosives (HMX), diaminodinitro ethylene (DADNE), 2,4,6,8,10,12-hexanitro-2,4,6,8,10,12-hexaazai-sowurtzitane (CL-20, also known as HNIW), and combinations thereof.

The propellant may also contain an additional fuel material, typically a metallic fuel comprised of, for example, aluminum, beryllium, boron, magnesium, zirconium, or mixtures or alloys thereof. Other components for incorporation into propellant compositions include plasticizers, burn rate modifiers, ballistic additives, and the like.

In general, propellant compositions of the invention are prepared by blending the alane with the oxidizer, the binder, and a curing agent effective to cure the admixture, e.g., hexane 1,6-diisocyanate, toluene diisocyanate, isophorone diiioscyanate, or the like. Proportions of fuel and oxidizer can be varied to optimize performance, as will be appreciated by those skilled in the art.

Other Uses

The present compounds may also be used as reducing agents, as polymerization catalysts, and as a hydrogen source in fuel cells and batteries.

Use as reducing agent: Alane and alane polymorphs as synthesized herein may be used as a chemical reducing agent in any context wherein a hydride donor is appropriate to bring about reduction, e.g., in reducing unsaturated carbon-carbon bonds such as present in alkenes and alkynes, in reducing carbonyl-containing moieties such as ketones, aldehydes, carboxylic acids, esters, amides acid chlorides, in converting halides to hydrido moieties, and the like. Typically, a compound to be reduced is dissolved in an organic solvent and reacted with the stabilized α-alane of the invention, prepared herein, and the reaction product then isolated and purified.

Use in Polymerization: Alane and alane polymorphs prepared using the methods described herein may also be used as polymerization catalysts, typically in catalyzing addition polymerization reactions (e.g., the polymerization of olefins). Generally, polymerization using the novel alane polymorphs as catalysts involves conventional processes wherein selected monomers are contacted with the alane polymorph under reaction conditions effective to provide the desired polymer composition. Polymerization may be carried out in solution, in a slurry, or in the gas phase. The monomer or comonomers used are preferably although not necessarily addition polymerizable monomers containing one or more degrees of unsaturation. Such monomers include olefinic and vinyl monomers such as ethylene, propylene, butadiene, styrene, and the like. The polymeric product resulting from the aforementioned reaction may be recovered by filtration or other suitable techniques. If desired, additives and adjuvants may be incorporated into the polymer composition prior to, during, or following polymerization; such compounds include, for example, additional catalysts (which may or may not be polymerization catalysts), pigments, antioxidants, lubricants and plasticizers.

Use as a hydrogen source in batteries and fuel cells: Additionally, alane and alane polymorphs prepared herein can be used as a hydrogen source in batteries and fuel cells. Alane provides a higher density of hydrogen than liquid hydrogen. Upon thermal or photochemical initiation, alane is theorized to initially produce an alane cation radical and a free electron. Both the cation radical and the electron can separately react with another alane molecule to initiate decomposition that results in the formation of hydrogen gas and aluminum metal. Thus, light, heat, or mobile electrons can be used as initiators to catalyze the decomposition. Accordingly, a composition containing the stabilized α-alane of the invention can be used for controlled release of hydrogen gas in a battery or fuel cell. In general, the alane products of the invention will find utility in hydrogen storage electrodes, particularly negative electrodes, in alkaline storage batteries that comprise a positive electrode, a negative electrode, and an aqueous alkaline electrolyte. In fuel cells, electrochemical devices for continuous delivery of electricity wherein the devices contain a fuel (e.g., a hydrogen source, and an oxidant), the alane products of the invention will find utility as the hydrogen source.

The flowchart and block diagrams in the Figures illustrate the architecture, functionality, and operation of possible implementations of systems and methods according to various embodiments of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A process for the manufacture of aluminum hydride under anhydrous conditions, the process comprising:
    catalyzing aluminum to enhance the reaction of the aluminum with hydrogen, wherein the catalyzing comprises:
        combining an amount of aluminum with an amount of gallium to form a eutectic mixture comprising aluminum and gallium; and
        applying to the eutectic mixture any of pressure, heat, electrical energy, and combinations thereof to activate the aluminum in the eutectic mixture when reacted with hydrogen; and
    exposing the catalyzed aluminum to hydrogen gas to form aluminum hydride.

2. The process according to claim 1, further comprising stabilizing the aluminum hydride with a donor solvent to produce stabilized alane.

3. The process according to claim 2, wherein the donor solvent comprises diethyl ether.

4. The process according to claim 2, further comprising:
    applying heat to etherated alane to recover at least a portion of the solvent; and
    isolating aluminum hydride from the etherated alane by thermal treatment.

5. The process of claim 1, wherein the eutectic mixture has an increased amount of activated aluminum relative to an amount of activated aluminum in the amount of aluminum alone.

6. The process of claim 1, wherein the exposing the catalyzed aluminum to hydrogen gas comprises:
    applying a predetermined amount of hydrogen gas under pressure less than 15,000 psi; and
    increasing the temperature of the combination of aluminum and gallium to an amount less than 150° C., so as to form an increased amount of aluminum hydride.

7. The process of claim 1, wherein the process occurs in the presence of an electrical force.

8. The process of claim 1, wherein the eutectic mixture is treated with hydrogen to create gallium hydride and aluminum hydride.

9. The process of claim 8, further comprising:
    allowing the gallium hydride to decompose into gallium and hydrogen; and
    recovering the gallium and the hydrogen and a remaining more stable aluminum hydride.

10. The process of claim 9, wherein allowing the gallium hydride to decompose into gallium and hydrogen comprises increasing the temperature of the gallium hydride to approximately 25° C.

11. The process of claim 2, further comprising:
    applying heat from temperatures ranging from approximately 20° C. to approximately 110° C. to the stabilized aluminum hydride to recover at least a portion of the donor solvent; and
    precipitating aluminum hydride from the stabilized aluminum hydride.

* * * * *